A. GARBARINI.
PUMPING APPARATUS.
APPLICATION FILED DEC. 26, 1919.
1,425,191.
Patented Aug. 8, 1922.
5 SHEETS—SHEET 1.
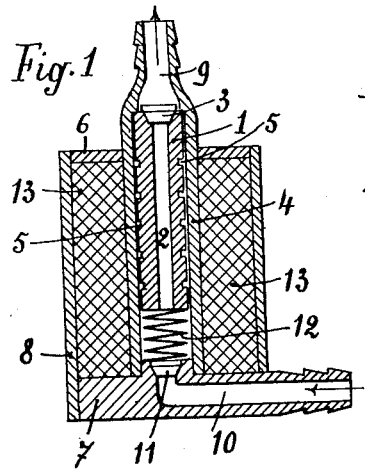
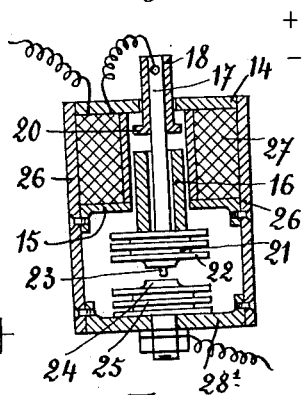
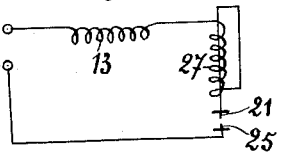
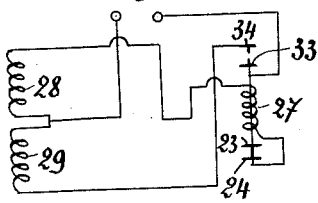
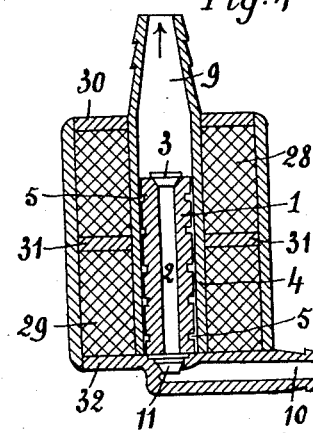
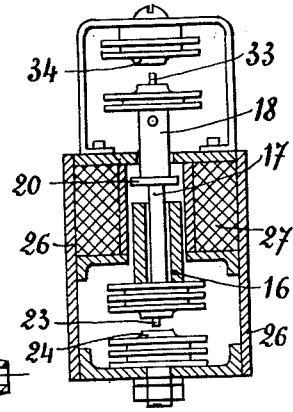
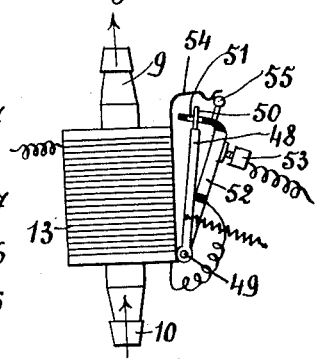
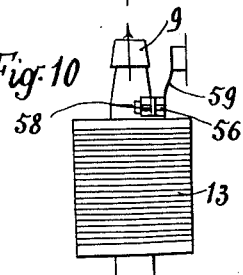
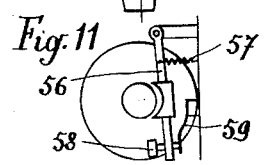
INVENTOR:
André Garbarini
By Attys
Fraser, Funk & Myers

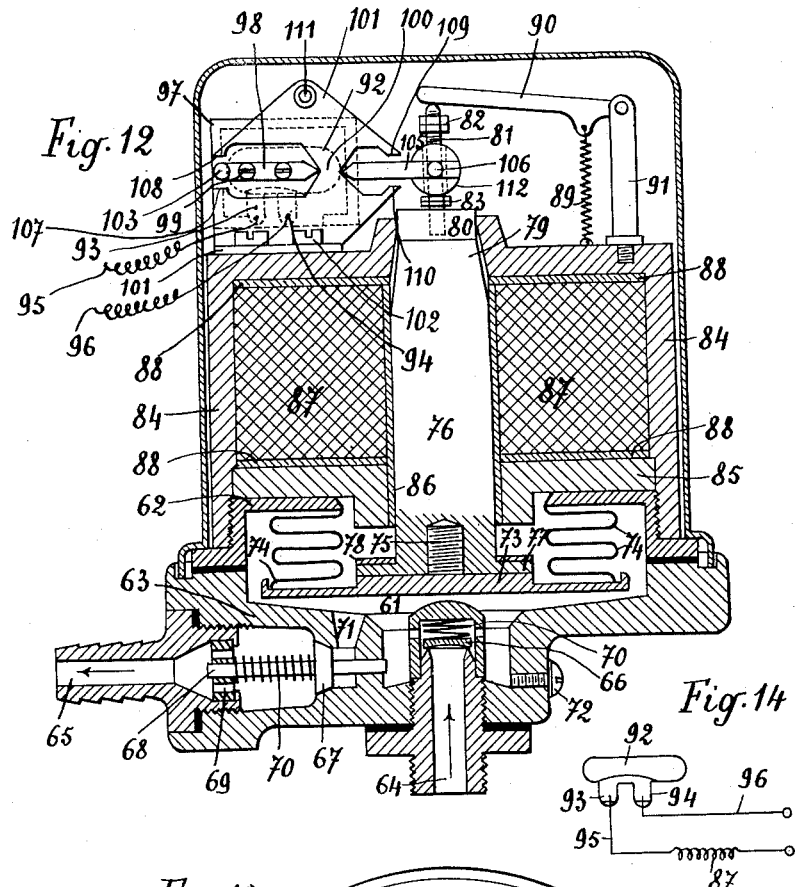
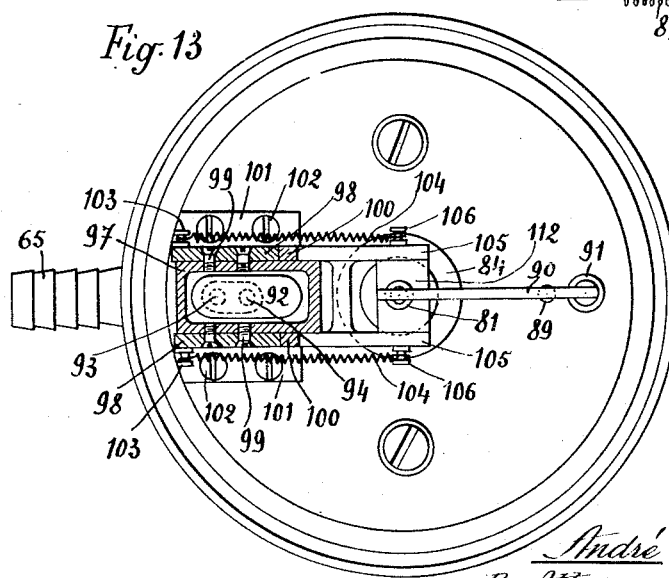

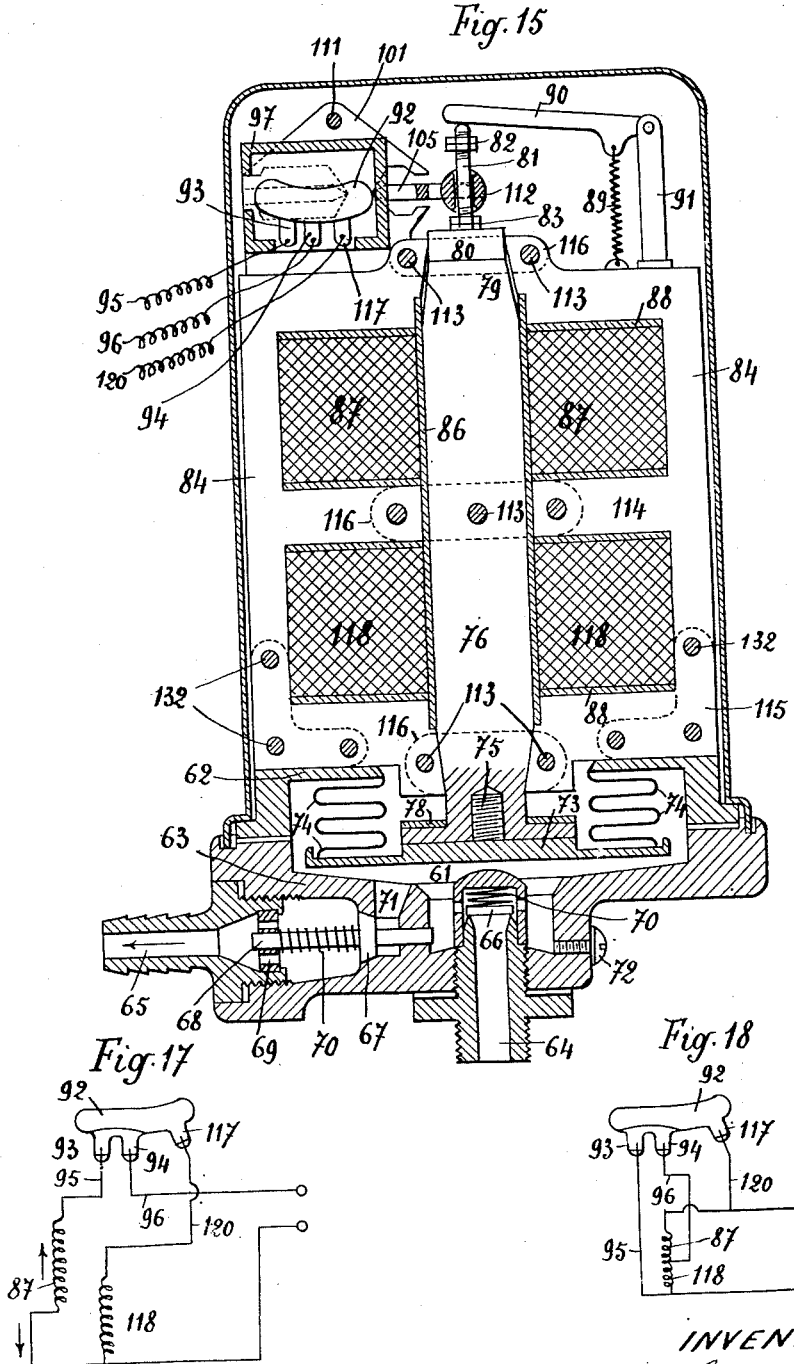

A. GARBARINI.
PUMPING APPARATUS.
APPLICATION FILED DEC. 26, 1919.
1,425,191.
Patented Aug. 8, 1922.
5 SHEETS—SHEET 4.
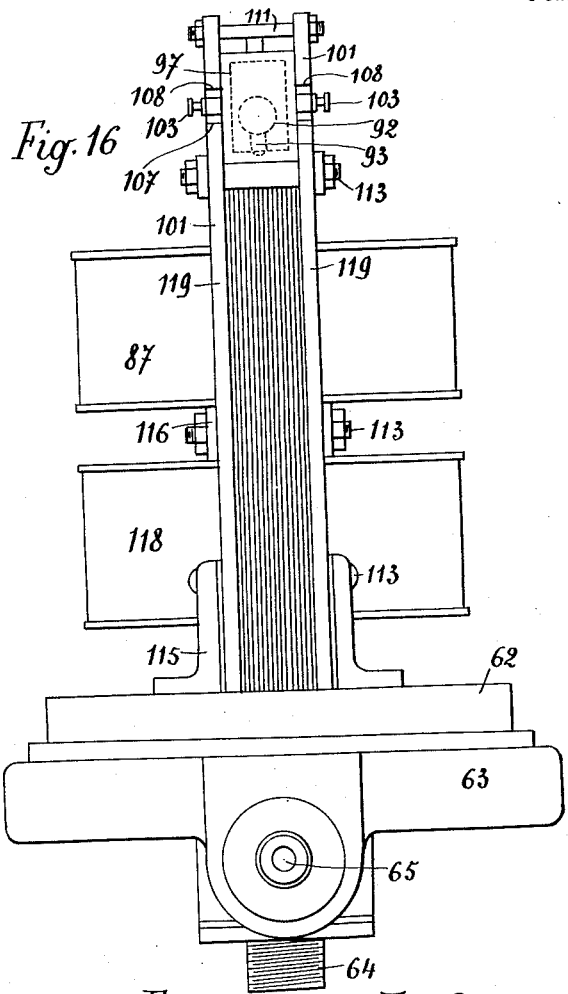
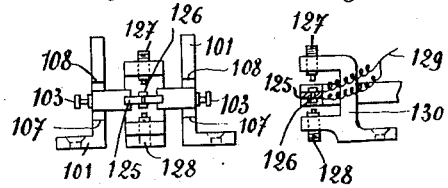
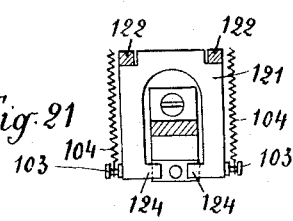
INVENTOR
André Garbarini
By Attys
Fraser, Dunk & Myers A. GARBARINI.
PUMPING APPARATUS.
APPLICATION FILED DEC. 26, 1919.
1,425,191. Patented Aug. 8, 1922.
5 SHEETS—SHEET 5.
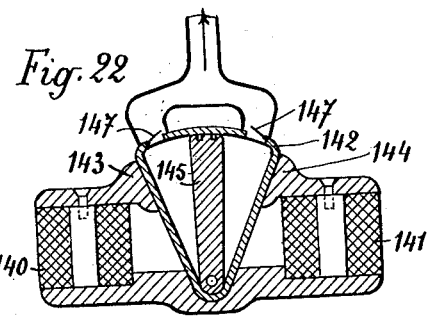
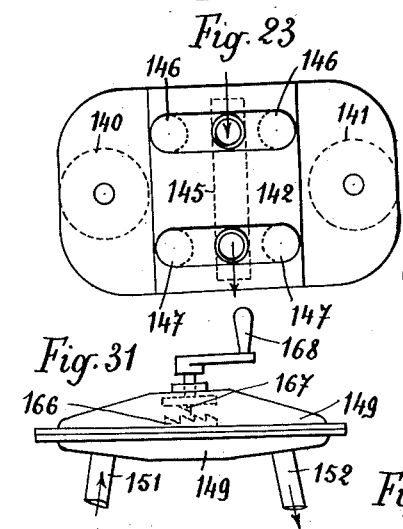
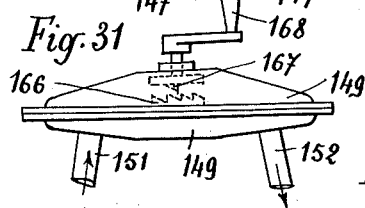
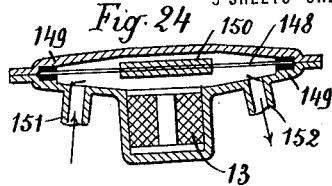
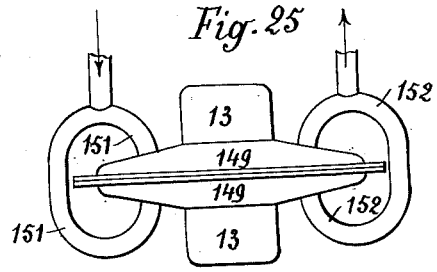
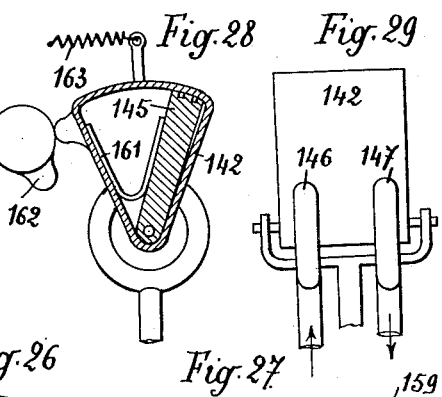
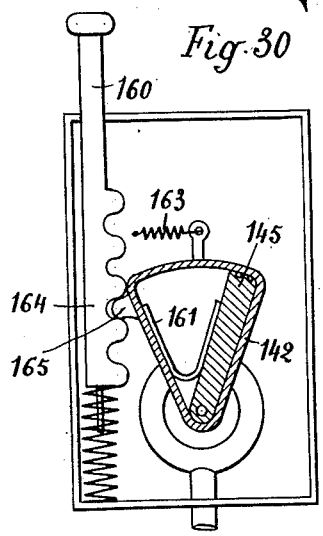
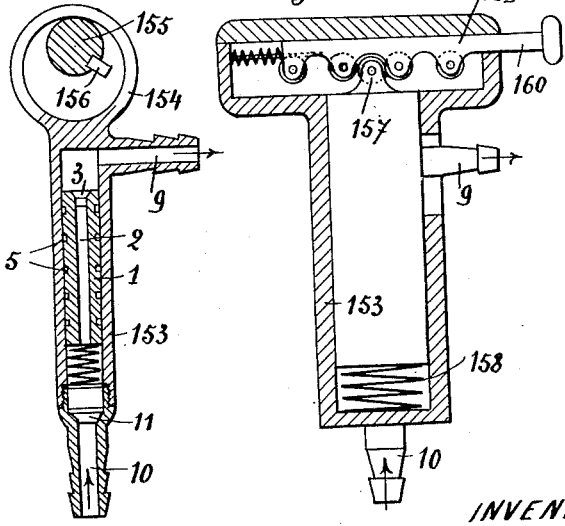
INVENTOR:
André Garbarini
By Attys
Fraser, Dirk & Myers

UNITED STATES PATENT OFFICE.

ANDRÉ GARBARINI, OF COURBEVOIE, FRANCE.

PUMPING APPARATUS.

1,425,191.  Specification of Letters Patent.  Patented Aug. 8, 1922.

Application filed December 26, 1919. Serial No. 347,642.

*To all whom it may concern:*

Be it known that I, ANDRÉ GARBARINI, a citizen of the Republic of France, residing in Courbevoie, Seine, France, have invented certain new and useful Improvements in Pumping Apparatus, (for which I have filed application in France, November 12, 1918, Patent No. 492,949), of which the following is a specification.

It is in many cases impracticable to employ pump operating mechanism of the usual character owing to the small rates of delivery which are often necessary.

For such small deliveries in fact pumps of the usual rotary or centrifugal type driven either by a small electric motor or some other source of power are extremely inefficient the mechanical losses involved being for apparatus of such small capacity so great that their operation is extremely inefficient. Furthermore the cost of pumping equipment comprising a small pump element and its actuating motor is relatively very high and the apparatus requires careful supervision and frequent attention.

The type of pump constituting the subject matter of the present invention is particularly applicable to pumping apparatus of small capacity, such for instance, as that employed for effecting circulation of a small quantity of water, petrol or other liquids or fluids as is required more particularly for the supply of liquid fuel or promoting the circulation of cooling water in internal combustion engines, an application being to effect the circulation of heated water from the main circulating system to a secondary system for the purpose of heating a vehicle by means of suitable radiators located near the chauffeur or otherwise, and another application being to effect the suction and compression of gaseous fluids for instance in inflating pneumatic tires and in starting internal combustion engines.

The improved type of pumping apparatus is also equally applicable for cases in which the necessary supervision of an ordinary type of pump cannot be insured and its simplicity and freedom from breakdown renders it particularly applicable for use in houses supplied with water from a well. Generally speaking this type of pump is applicable to all cases in which a pump of small capacity is required up to a capacity of several hundreds litres per hour.

A characteristic feature of the improved pump is that the piston vane or diaphragm according to the design adopted is not rigidly or mechanically connected to the operating element, the operating movements or strokes of the piston vane or diaphragm being effected either magnetically or by utilizing the inertia of this portion of the apparatus.

The accompanying drawings illustrate by way of example a number of different constructions which may be employed in carrying the invention into practice.

In the case of electro-magnetical operation, according to the manner in which the magnetic circuit is arranged the pump is capable of raising liquid by suction from a considerable depth and delivering it at a small additional height or head under which conditions the suction is effected by electro-magnetic action and the lift by gravity or the action of a spring. Alternatively the lift by suction can be effected from a comparatively small depth and the water may be delivered at a considerable height in which case the suction is effected by gravity or a spring and the lift by electro-magnetic action. Again the pump may be arranged to draw liquid from a considerable depth and to deliver it at a relatively great height in which case both the suction and lift are electro-magnetically operated.

Figure 1 is a view in vertical section of an oscillating electric pump having a single actuating winding.

Figure 2 is a view in vertical section of a vibrating switch which may be employed in connection with the pump having a single actuating winding.

Fig. 3 illustrates the system of connections for the pump shown in Fig. 1.

Fig. 4 is a view in vertical section of an oscillating electric pump having a double actuating winding.

Fig. 5 is a view in vertical section of a vibrating switch suitable for use with the pump shown in Fig. 4.

Fig. 6 illustrates the system of connections for the pump of Fig. 4.

Fig. 7 illustrates a modification of the pump having a double actuating winding in which a vibrating switch constitutes a part of the pump.

Fig. 8 is a plan view of the modification of Fig. 7.

Fig. 9 illustrates another modification of an electric pump comprising a vibrating switch.

Fig. 10 is a view in elevation illustrating a further modification. Fig. 11 being a plan view of the same.

Fig. 12 is a view in longitudinal section of a suction pump adapted for operation by continuous current.

Fig. 13 being a plan view of the same.

Fig. 14 is a diagram showing electrical connections employed in the arrangement of Figs. 12 and 13.

Fig. 15 is a view also in longitudinal section of a suction and lifting pump adapted for operation by continuous or alternating current. Fig. 16 being a view in side elevation. Figs. 17 and 18 show diagrammatically electrical connections employed in the arrangement of Figs. 15 and 6.

Figs. 19, 20 and 21 illustrate in front elevation, side elevation and plan respectively one form of construction of automatic contact making device which can be applied to either of the arrangements illustrated in Figs. 12, 13 or 15 and 16.

Fig. 22 illustrates a double acting electric pump having a double actuating winding in which the central piston core of the preceding arrangements is replaced by a vane located in a suitable chamber. Fig. 23 being a plan view of this construction.

Fig. 24 illustrates a further modification of an electric pump having a single actuating winding in which the piston or vane is replaced by a flexible diaphragm.

Fig. 25 is a view of a pump similar to that of Fig. 14 but having a double actuating winding and of the double acting type.

Fig. 26 is a view in vertical section of a pump similar to that of Fig. 1 but arranged to be mechanically operated.

Fig. 27 illustrates a modification of the pump in Fig. 26 adapted to be operated by a press button or rod.

Fig. 28 is a view in vertical section of a pump similar to that shown in Fig. 22 but arranged to be mechanically operated. Fig. 29 being a side view of the same.

Fig. 30 illustrates a modification of the pump shown in Fig. 29 but adapted to be operated by a press button or rod.

Fig. 31 is a view in elevation of a pump with a flexible diaphragm actuated by hand.

The oscillating electric pump having a single winding as shown in Fig. 1 comprises a core 1 constituting a piston provided with a longitudinal passage 2 at the upper end of which is located an outlet valve 3, the piston 1 which is adapted to reciprocate within a barrel 4 being rendered fluid tight by means of ring grooves 5. The upper and lower collars 6 and 7 are composed of magnetic metal and are provided with a tubular housing 8 also composed of magnetic metal so as to constitute a magnetic circuit of very low reluctance.

Nozzles 9 and 10 are provided for establishing communication with the interior of the pump, the nozzle 10 being provided with a suction valve 11. A spring 12 disposed underneath the piston 1 serves to return the latter to its normal position. Surrounding the barrel 4 is a winding 13 which is connected to a vibrating switch of special construction as will be hereinafter explained.

It will be understood that whenever electric current passes through the winding 13 the piston core 1 will be promptly attracted downwards causing the outlet valve 3 to open, when the flow of current is interrupted the piston 1 will return to its initial position, thereby causing compression within the nozzle 9 by means of the valve 3 at the same time causing suction in the nozzle 10. This surge of current in the winding 13 thus effects a suction and delivery stroke of the pump.

In order to obtain a regular and continuous delivery it will be obviously sufficient to cause the surges of current to take place in a regular and frequent manner.

An intermittent flow of current for this purpose is effected by means of the vibrating device illustrated in Fig. 2. The magnetic circuit of this device comprises iron collars or discs 14 and 15 and a core 16 mounted upon a rod 17 in which it is capable of free sliding movement. The rod 17 is secured to a bushing 18 provided with a projecting flange or collar 20, the opposite extreme of the rod 17 carrying a head 21 provided with cooling ribs or flanges 22 and a contact 23 adapted to engage with another contact 24 mounted on a head 21 provided with cooling ribs or fins. The magnetic circuit of the device is completed by an iron housing 26 enclosing an actuating winding 27, an annular support 15 for which and an insulating base plate 28' being secured to the housing 26 by means of screws.

The vibrating device is connected in series with the pump winding as shown in Fig. 3. When the circuit is closed current passes through the windings 13 and 27, the contact 23 remaining in engagement with the contact 24 until the core 16 (see Fig. 2) is attracted whereupon the core 16 abuts against a flange 20 and carries it upwards together with the rod 17 and the head 21 secured thereto. The contact 23 on the head 21 is thus lifted from the contact 24 and the circuit being thereby broken the core 16 falls carrying with it the rod 17 and the head 21 thus establishing the electric circuit, whereupon this cycle of operation is repeated. In certain cases a condenser may be connected to the contacts 22 and 23 for the purpose of reducing sparking.

The characteristic feature of this vibrating device is that it enables successive surges of current to be effected in circuits having considerable self-induction these circuits acting upon a moving element having an appreciable mass and therefore considerable inertia so that the duration of the interval during which a contact is established must be sufficiently long to permit the current to reach its maximum intensity and therefore to impart the necessary acceleration to the moving element.

The vibrating device above described with reference to Fig. 2 enables these conditions to be realized since the duration of the interval of contact is the time taken by the core 16 to traverse a distance separating it from the flange 20, this distance being arranged to be adjustable.

Figs. 4, 5, 6 illustrate respectively a pump having a double actuating winding, a double actuating vibrating device and its diagram of connections. In this case the spring 12 in the construction shown in Fig. 1 is replaced by a winding having a magnetic action similar to the mechanical action of the spring. This modification therefore comprises two windings 28 and 29 separated by magnetic partitions 30, 31, 32. The vibrating device shown in Fig. 6 is provided at the upper end of the rod 17 with a second contact 33 adapted to engage with a contact 34, the contacts 23 and 24 being similar to those of the device shown in Fig. 2 and controlling the supply of current to the coil 28. The upper contacts 33 and 34 control the supply of current to the coil 29 as shown in the diagram of connections of Fig. 6.

Figs. 7 and 8 illustrate a modification of a pump having two actuating coils 28 and 29 in which the vibrating device is combined with the pump.

In this arrangement the oscillation of an armature 35 pivoted at 36 is utilized, the extremities of this armature being attracted alternately by the poles 37 and 38 of the two coils 28 and 29. The armature 35 is provided with a pin 39 adapted to engage with the cross piece 40 of an oscillating frame 41 carrying a contact spring 42 adapted to engage alternately with contacts 43 and 44. A pair of springs 45 fixed at one end at 46 and at the other end at 47 to the oscillating frame serving to maintain the pin 39 in contact with the lower portion of the cross piece when the armature is attracted by the pole 7 and to carry the pin towards the upper part of the cross piece when the armature is attracted by the pole 38.

By these upward and downward movements of the pin within the cross piece a similar action is obtained to that of the vibrating device described with reference to Fig. 2, that is to say the duration of the interval of contact is substantially long to permit the current to attain its maximum intensity.

In the modification of the electrically actuated pump shown in Fig. 9 the vibrating device which forms part of the pump comprises an armature 48 pivoted at 49 and subject to the control of a spring, the armature 48 carrying a pin 50 projecting within an opening in the cross piece 41 similar to that of Fig. 7 this cross piece being carried by a pivoted arm 52 which is arranged to close the circuit of the winding 13 when it is in engagement with the contact 53. The two positions ("on" and "off") of the contact carrying arm 52 are pivoted by means of a light spring 54 which comes in contact with a projecting head 55 carried by the lever 52. In the modification illustrated in Figs. 10 and 11 the vibrating device is constituted by a pivoted armature lever 56 controlled by a spring 57 and carrying a contact point 58 which comes into engagement with a light spring contact 59 adapted to follow the movement of the lever 56 during a portion of its travel when this lever is attracted by the electromagnet in such a manner as to operate in the same way as the cross piece described with reference to Figs. 7 and 9.

In the constructional form illustrated in Figs. 12 and 13 the pump comprises a pump chamber 61 enclosed by two cylindrical walls 62, 63, the lower wall 63 is provided with a suction nozzle 64 and a delivery nozzle 65 having suction and delivery valves indicated at 66 and 67 respectively. The delivery valve 67 is provided with a valve stem 68 adapted to be maintained in a central position by means of a spider 69. Springs indicated at 70 are also provided for ensuring the closing of the two valves 66 and 67. Communication is established between the pump chamber 61 and the chamber containing the delivery valve through a passage indicated at 71, a vent 72 for drainage purposes being provided at the base of the pump chamber 61.

The piston 73 of the pump is connected to the cylindrical wall 62 by means of a bellows casing 74 composed for instance of extremely thin dished discs soldered or welded together at their outer edges. The piston plate 73 carries a screw threaded stud secured to the core 76 of the electromagnet. The core 76 is preferably cylindrical its base being provided with a flange 77 of greater diameter than the core thus permitting its upward travel to be adjusted by interposing annular washers or spacing pieces 78 of non-magnetic material and of suitable thickness. The upper portion of the core 76 terminates in a conical neck 79 surmounted by a cylindrical extension 80. Screw threaded into the upper portion of the core 76 is a screw threaded bolt or rod 81 provided with nuts 82 and 83 for the purpose of adjusting the action of the contact making device, these nuts being preferably provided with lock nuts, The magnetic circuit of the electro-magnet is completed by the yoke 84 and the base portion 85, the centre of the latter being provided with a cylindrical opening in which a sleeve 86 of non magnetic material is inserted for the purpose of ensuring a uniform air gap and at the same time serving as a guide for the core 76. The upper part of the yoke 84 is provided with a cylindrico-conical opening corresponding in shape to the portions 79 and 80 of the core the base of the cylindrical yoke being screw threaded internally so that it may be screwed to the upper wall 63 of the pump chamber thereby securing the coil 87 of the electro-magnet and the base plate 85 of the latter in position. The coil 87 is itself supported between two cheeks 88 soldered to the sleeve 86 the lower portion of which is extended so as to serve as a guide for the core 76. The downward movement of the core is effected partly by its own weight and partly by the action of a spring 89 arranged to act upon a lever 90 pivoted to the standard 91.

The contact making device comprises a mercury contact element and a rocking frame so arranged that the movement of the core to one or other of its extreme positions causes a quick contact make or break. The contact element comprises a container 92 (see Figs. 12 and 13) provided with two small cups 93 and 94 filled with mercury. A further quantity of mercury in the container serves during the rocking of the latter to connect the mercury in the two cups and consequently close the circuit connected thereto or alternately this body of mercury is transferred to the opposite end of the container so as to open the circuit. The mercury contained in the cups 93 and 94 is connected to the external circuit by means of two conductors 95 and 96.

The container 92 is surrounded and sealed within a metal casing 97 to which an oscillating movement is imparted by means of knife edges 98 secured by means of screws 99 to the casing 97. The knife edge members 98 engaging with V notches 100 formed in two side plates 101 bent over at their bases and secured by means of screws 102 to the yoke 84. The elements 98 which are provided with knife edges at one end carry at their opposite ends small stops 103 to which are attached two springs 104. Opposite the knife edge members 98 is a fork member 105 pivotally mounted upon the notches 100 and carrying two studs 106 to which the other ends of the springs 104 are attached. It will be understood that in accordance with the position of the fork member 105 the springs 104 can be moved so as to be above or below the line joining the two sets of V notches thus causing a rapid movement of the whole contact element either upwards to close the circuit or downwards to open the circuit. The two plates 101 are cut away so as to form stops 107, 108, 109, 110 limiting the movement of the contact element and of the fork member 105, a cross bar 111 connecting the two side plates being provided for increasing their rigidity. Upon the fork member 105 is mounter a cylindrical element 112 pivotally mounted upon extensions of the studs 106 and provided with a flared aperture through which the stud mounted on the core 76 loosely passes, the nuts 82 and 83 serving to regulate the range of travel.

The operation of the system is as follows:

The piston being at the lower extremity of its downward travel the nut 82 has moved the fork member 105 downwards, thus causing a quick movement downwards of the contact element to close the energizing circuit of the coil 87 of the electro-magnet; at this instant the core is quickly drawn upwards and consequently carries with it the piston 73 of the pump thus producing suction of the liquid. The nut 83 causes the cylindrical member 112 to move upwards thereby bringing the locking device above described against the stops 108 and 109 whereby the circuit is opened. The core under its own weight aided by the action of the spring 89 transmitted through the lever 90 causes the downward movement of the core and the piston 73 and compresses the liquid which has previously been sucked in. At the end of the downward travel the nut 82 causes the cylindrical member 112 to move downwards thereby causing a rapid movement of the rocking system against the stops 107 and 110, the circuit of electro-magnet being thus re-closed so as again to produce a suction stroke of the pump, this cycle of operation being continued.

If the position of the core relative to the other portions of the pump be reversed, or in other words if the conical portion 79 is arranged at the bottom so that the working stroke of the core is a downward stroke the action of the lever 90 being also reversed the device will constitute a pump capable of suction from a small depth and delivery at a considerable height.

Figs. 15 and 16 illustrate a construction of suction and lifting pump adapted for operation by continuous or alternating current. In this case the magnetic circuit is constituted by laminated sheets connected together by bolts or rivets 113, the core 76 being also of laminated construction. A double magnetic circuit is provided the pump comprising two electromagnets having a common core element 114. The body of laminated plates constituting the core are held together by lugs or brackets 115 cast on the upper wall 62 of the pump chamber. The core is in this case of considerably greater length and is prolonged at either end to form conical and cylindrical portions serving as guides which co-operate with bearing elements 116 to permit the movement of the core in a perpendicular direction the bearing 116 being secured to the core laminations by riveting. The pump itself is in this respect identical with that of the previous construction in the contact making device except that the latter comprises three cups instead of two, its oscillating movement producing the closure of a circuit between the central cup 94 and one or other of the end cups 93 or 117 in such a manner as to energize either the coil 87 or the coil 118. A conductor 120 serves to connect the mercury contained in the end cup 117 to the external circuit. The coil 87 corresponds to the upward movement of the core and consequently to the suction stroke when the core reaches the upper limit of its travel it operates the contact device and closes the circuit of the electromagnet 118 causing the downward stroke, that is to say the delivery stroke. As will be readily understood the spring 89 and the lever 90 can be dispensed with in this construction, the side plates 101 being no longer separately formed but being constituted by a continuation of the two clamping plates 119 which are provided for increasing the rigidity of the laminated construction. The contact device comprises the same elements as those above described.

Figs. 19, 20, 21 illustrate a modified construction of contact making device. The mercury device and its container are in this case replaced by a permanent magnet 121 carrying knife edges 122 and studs 103 to which the springs 104 are attached. Between the two poles 124 of the magnet an insulating plate 125 is arranged carrying the double contact 126 which is connected to a conductor 129 and can be brought into engagement either with a contact screw 127 or another contact screw 128, these two contact screws being mounted upon a common insulating support 130 which is itself secured to the body of the electromagnet.

With this arrangement it will be readily understood that the interruption of the circuit is effected in the field of the permanent magnet.

Figs. 14, 17 and 18 illustrate the electrical connections employed with the different arrangements above described. Fig. 14 shows the diagram of connections employed in the case of a pump having one electromagnet (Figs. 12 and 13). Fig. 17 indicates the connections employed in the case of a pump having two electromagnets (see Figs. 15 and 16) the circuits of each of these being separate and distinct. Fig. 18 is a diagram of connections suitable for a pump having a double electromagnet (see Figs. 15 and 16) in which the two windings are connected in series with one another, the contact device serving to short-circuit one or the other of these windings.

The improved pump, various types of construction of which have been described, referring to Figs. 12, 13 and 15, 16, can be employed without alteration for the suction and compression of gaseous fluids for instance in inflating pneumatic tires and in starting internal combustion engines.

Figs. 22 and 23 illustrate a modified construction of electric pump having two actuating windings in which the central core constituting the piston is replaced by a vane adapted to oscillate in a suitable casing.

In this arrangement a fixed pump chamber 142 is located between the two windings 140 and 141, the walls of this chamber being in contact with the poles 143 and 144 of the two windings.

Arranged in the interior of the chamber 142 is a movable armature vane 145 adapted to be alternately attracted by the poles 143 and 144 so as to perform a suction and compression stroke during each of its complete oscillations.

The type of pump illustrated is double acting and two inlet valves 144 and two outlet valves 147 are therefore provided thus enabling a continuous flow of liquid to be obtained.

In Fig. 24 an electrically actuated single acting pump is illustrated comprising a diaphragm 148 clamped between two casing elements 149, an armature 150 being mounted centrally on the diaphragm 148. The lower casing 149 is provided with an inlet pipe 151 and an outlet pipe 152.

The lower casing also contains a winding 13 which under the action of a suitable vibrating device causes the operation of the diaphragm under the attraction of the armature 150.

In the modified construction of diaphragm pump illustrated in Fig. 25 both faces of the diaphragm are rendered operative by the provision of two windings arranged as indicated at 13, a suitable double acting vibrating device being provided. This construction of pump is double acting each of the casings 69 being provided with an inlet pipe 151 and outlet pipe 152 for this purpose.

Figs. 26 to 30 of the drawings illustrate various constructions of pumps similar to those already described except that in these constructions mechanical action is substituted for electrical actuation.

The pump illustrated in Fig. 26 which corresponds to that shown in Fig. 1 utilizes the inertia of a piston 1 which remains stationary during operation, the casing or cylinder 153 only being set in motion by suitable means such for instance as by a ring 154 encircling a shaft 155 carrying a cam or projection 156.

In the modification illustrated in Fig. 27 the cylindrical casing 153 is provided with a roller 154 at its upper end, the lower end of the cylinder being pressed upwards by means of a spring 158 which serves to bring the roller 157 into engagement with a roller rack 159 forming part of a rod 160 adapted to be given a to and fro movement when manually operated, thereby imparting a series of rapid oscillations to the cylinder 153, the piston remaining stationary within this cylinder.

The double acting pump illustrated in Figs. 28 and 29 represent a mechanically actuated pump corresponding to the electrically actuated pump described with reference to Figs. 22 and 23.

In this construction the vane 145 is free to move within the casing 142 subject to the action of a spring 161. A more or less rapid oscillating movement is arranged to be imparted to the chamber 142 by means of a suitable cam 162 or other device, a spring 163 for effecting the return movement of the casing being provided if a cam is employed.

The type of pump already described with reference to Figs. 28 and 29 can also be operated by means of a manually operated rod 160, adapted to execute a to and fro movement, the rod 160 comprising a rack of the usual type or provided with rollers 164 as shown in Fig. 30 which acts upon a projection 165 mounted upon the chamber 142.

The electrically actuated diaphragm pump described with reference to Fig. 24 can also be arranged to be manually operated. In this case as shown in Fig. 31 the pump is single acting and the diaphragm is provided with a circular rack 166 provided with the usual teeth or rollers adapted to be engaged by a tooth or roller 167 carried by a rotating disc which is connected to the operating handle 168.

The electrically actuated pumps above described necessarily embody electromagnets the construction of which should be determined in accordance with the ordinary principles of design of electromagnets. The upper and lower collars of the electromagnets are preferably slotted radially and their cylindrical housings slotted longitudinally, the tube or the cylinder in which the core reciprocates being constructed of insulating material whenever possible being if necessary also covered with a non-magnetic metallic shell which is slotted longitudinally. In devices intended for operation by alternating current, it will be necessary to employ laminated iron as much as possible.

In certain cases when the frequency of alternation is sufficiently low the vibrating device may be displaced in which case it will be of advantage to reduce to a minimum the mass of the core or movable vane.

Having now particularly described and ascertained the nature of my said invention and in what manner the same is to be performed, I declare that what I claim is:—

1. A pumping device comprising a valved chamber, a fluid moving element in cooperative relation therewith and having a part, at least, constructed of magnetic material, and means comprising a source of electrical energy, an electromagnet and current controlling mechanism therefor for intermittently establishing a magnetic field through the magnetic portion of said fluid moving element, whereby the same may be operated independently of any mechanical connection with said source of energy, said current controlling mechanism including a quick throw electric switch and means operated by the movements of the fluid moving element for alternately opening and closing the same at the respective ends of its operating stroke.

2. A pumping device comprising a valved chamber, a fluid moving element in cooperative relation therewith and having a part, at least, constructed of magnetic material, and means comprising a source of electrical energy, an electromagnet and current controlling mechanism therefor for intermittently establishing a magnetic field through the magnetic portion of said fluid moving element, whereby the same may be operated independently of any mechanical connection with said source of energy, said current controlling mechanism including a mercury switch having a plurality of electrodes each terminating in a mercury cup, and means for suddenly tilting said switch in opposite directions at the ends of the strokes of said fluid moving element so as to cause said mercury to flow between said cups and thereby intemittently connect and disconnect said electrodes.

3. A pumping device comprising a valved chamber, a fluid moving element in cooperative relation therewith and having a part, at least, constructed of magnetic material, and means comprising a source of electrical energy, an electromagnet and current controlling mechanism therefor for intermittently establishing a magnetic field through the magnetic portion of said fluid moving element, whereby the same may be operated independently of any mechanical connection with said source of energy, said current controlling mechanism including a mercury switch, supporting means therefor, a knife edge connection between said switch and said supporting means, a tilting device also having a knife edge connection with said supporting means, springs connecting said tilting device and said switch, limiting stops between said switch and tilting device and said supporting means, and means controlled by said fluid moving element for actuating said tilting device and switch at the end of each stroke.

In witness whereof, I have hereunto signed my name in the presence of a subscribing witness.

ANDRÉ GARBARINI.

Witness:
RENÉ BARDY.